(12) United States Patent
Tages (10) Patent No.: US 10,227,107 B1
(45) Date of Patent: Mar. 12, 2019

(54) CHAIN LIFT AND DERAILLEUR HOLD TOOL FOR BICYCLES

(71) Applicant: Radian Technologies Corporation, Coral Springs, FL (US)

(72) Inventor: Fernando Tages, Coral Springs, FL (US)

(73) Assignee: Radian Technologies Corporation, Coral Springs, FL (US)

( * ) Notice: Subject to any disclaimer, the term of this patent is extended or adjusted under 35 U.S.C. 154(b) by 0 days.

(21) Appl. No.: 16/124,824

(22) Filed: Sep. 7, 2018

(51) Int. Cl.
*B62M 9/124* (2010.01)
*B62M 9/125* (2010.01)
*B62M 9/128* (2010.01)

(52) U.S. Cl.
CPC ............ *B62M 9/124* (2013.01); *B62M 9/125* (2013.01); *B62M 9/128* (2013.01)

(58) Field of Classification Search
USPC .................................................. 474/130, 80
See application file for complete search history.

(56) References Cited

U.S. PATENT DOCUMENTS

| | | | | |
|---|---|---|---|---|
| 3,840,251 A | * | 10/1974 | Hautier | B62M 9/16 280/304.5 |
| 3,862,487 A | * | 1/1975 | Van Gundy | B25B 27/22 269/47 |
| 4,135,727 A | * | 1/1979 | Campagnolo | B62M 25/04 280/236 |
| 4,167,125 A | * | 9/1979 | Hedrich | B62M 9/125 474/82 |
| 4,681,557 A | * | 7/1987 | Hillman | B62J 99/00 474/119 |
| 5,003,656 A | * | 4/1991 | Loppnow | B25B 27/0071 248/231.81 |
| 5,888,159 A | * | 3/1999 | Liao | B62M 9/16 474/101 |
| 7,467,477 B1 | * | 12/2008 | Flemming | B62M 9/125 33/533 |
| 2003/0056294 A1 | * | 3/2003 | Ostor | B25B 13/56 7/138 |

* cited by examiner

*Primary Examiner* — Henry Y Liu
(74) *Attorney, Agent, or Firm* — Christopher & Weisberg, P.A.

(57) ABSTRACT

A method and tool provide for removal of a rear bicycle wheel of a bicycle having a rear derailleur. A securing device maintains the tool in a fixed position with respect to the bicycle. A chain disengagement element is moveably attached to the securing device whereby moving the chain disengagement element moves a portion of the chain away from an axel mounted gear cassette sufficiently to completely disengage the chain from the axel mounted cassette. This allows for easy removal of the wheel.

15 Claims, 8 Drawing Sheets

CHAIN LIFT AND DERAILLEUR HOLD TOOL FOR BICYCLES

FIELD

The disclosure is generally related to a mechanical hand tool, and more particularly to a tool for removing a chain from a gear such as a bicycle chain from a rear wheel gear cassette.

BACKGROUND

Cycling is a major global activity. Approximately 80 million bicycles are sold each year (12 million in the USA). Like most mechanical implements, bicycles require maintenance and repair. Common tasks, such as attaching a bicycle to an indoor trainer, regular maintenance, and replacement of a flat tire, require the removal of a wheel having the flat tire. While removal of a front bicycle wheel is relatively simple, removal of a rear wheel from a bicycle having a rear derailleur is widely considered a difficult and dirty task.

The rear derailleur is part of a gear shifting system, wherein the rear derailleur positions a moving chain laterally from gear to gear as desired, while maintaining appropriate tension on the chain to allow it to stay engaged with different sized gears without creating slack in the chain. Since the rear derailleur is spring loaded to maintain chain tension, it must be forced rearward and held away from the gears so that the wheel can be disengaged from the chain and the bicycle frame. Once the wheel is removed, the chain dangles and rests on the bicycle frame marring it with grease/oil and scratching the finish. Re-installing the rear wheel is typically more difficult than removal. Most often, such repairs are performed by a single person with two hands. One hand might hold the bike and the other might hold the wheel to disengage it from the bicycle frame while the person struggles to use one of the two hands to also push back the rear derailleur and disengage the greasy chain from the gears. This is both awkward and difficult.

While work-stands are known to for supporting and holding a bicycle in place for maintenance, thereby freeing up one hand, chain disengagement and wheel removal are still done by hand. There are no known tools for facilitating chain disengagement and removal of a rear wheel.

SUMMARY

A tool is disclosed for facilitating removal of a wheel from a bicycle having a derailleur system. In the illustrated example, a rear derailleur is secured to a bicycle frame at a derailleur pivot point and the derailleur pivot point defines an aperture. The derailleur maintains a drive chain in selective engagement with a wheel having an axel mounted cassette with multiple cogs or gears. The wheel is securable to a bicycle frame having frame elements that include chain and seat stays. The tool includes a securing device to maintain the tool in a fixed position with respect to the bicycle; and a chain disengagement element moveably attached to the securing device, wherein moving the chain disengagement element moves a portion of the chain away from the axel mounted cassette sufficiently to completely disengage the chain from the axel mounted cassette.

The tool can include a locking mechanism to prevent the chain disengagement element from moving with respect to the securing device, as well as a derailleur hold element that is movable with respect to the securing device to pivot the derailleur and which is lockable to maintain the derailleur in a selected position. A pin that is part of the tool can be inserted into the aperture defined by the derailleur pivot point so that the chain disengagement element rotates about the pin, wherein the pin serves as the securing device.

The chain disengagement element can include a first portion having a first end and a second end, the first end pivotable with respect to the securing device, the second end having a laterally extending element, a second portion having a first end and a second end, the first end of the second portion being pivotally secured to the laterally extending element of the second end of the first portion, and a third portion having a first end and a second end, the first end of the third portion being pivotally secured to the second end of the second portion.

The locking mechanism can include a first portion having a first end and a second end, the first end being pivotable with respect to the securing device, a second portion having a first end and a second end, the first end of the second portion being pivotally secured to the second end of the first portion. A first support element projects laterally from the first portion, and second support element projects laterally from the second portion.

A method of disengaging a bicycle chain from bicycle having a rear derailleur and a rear wheel cassette of cogs, includes providing a tool; securing the tool to the bicycle; using the tool to pivot the rear derailleur towards the rear of the bicycle; and using the tool to lift the bicycle chain away from the rear wheel cassette of cogs. The method may further include using the tool to lock the rear derailleur in the rearward position; and using the tool to lock the chain in a position that is disengaged from the rear wheel cassette of cogs.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The present invention provides a tool and method for quickly and easily removing a rear bicycle wheel. The tool attaches to a bicycle, lifts and holds the bicycle drive chain away from the cassette of cogs/gears, and pulls back and holds the rear derailleur. In a hands-free manner the invention holds the chain away from the cassette and holds the derailleur in the proper position for wheel removal, bicycle cleaning, and maintenance.

Advantages provided by the invention include: 1) making normally difficult rear wheel removal and installation easy; 2) protecting frame finish by holding the chain away from the frame when the wheel is removed; 3) allowing quick and easy wheel bearing testing while the wheel is still installed on the bicycle, but with the chain disengaged from the cassette; 4) allowing bicycle maintenance to be performed by holding the chain away from the frame when the wheel is removed; and 5) and allowing the front chain ring/crankset to be rotated while wheel is removed.

Figures 1, 1A:
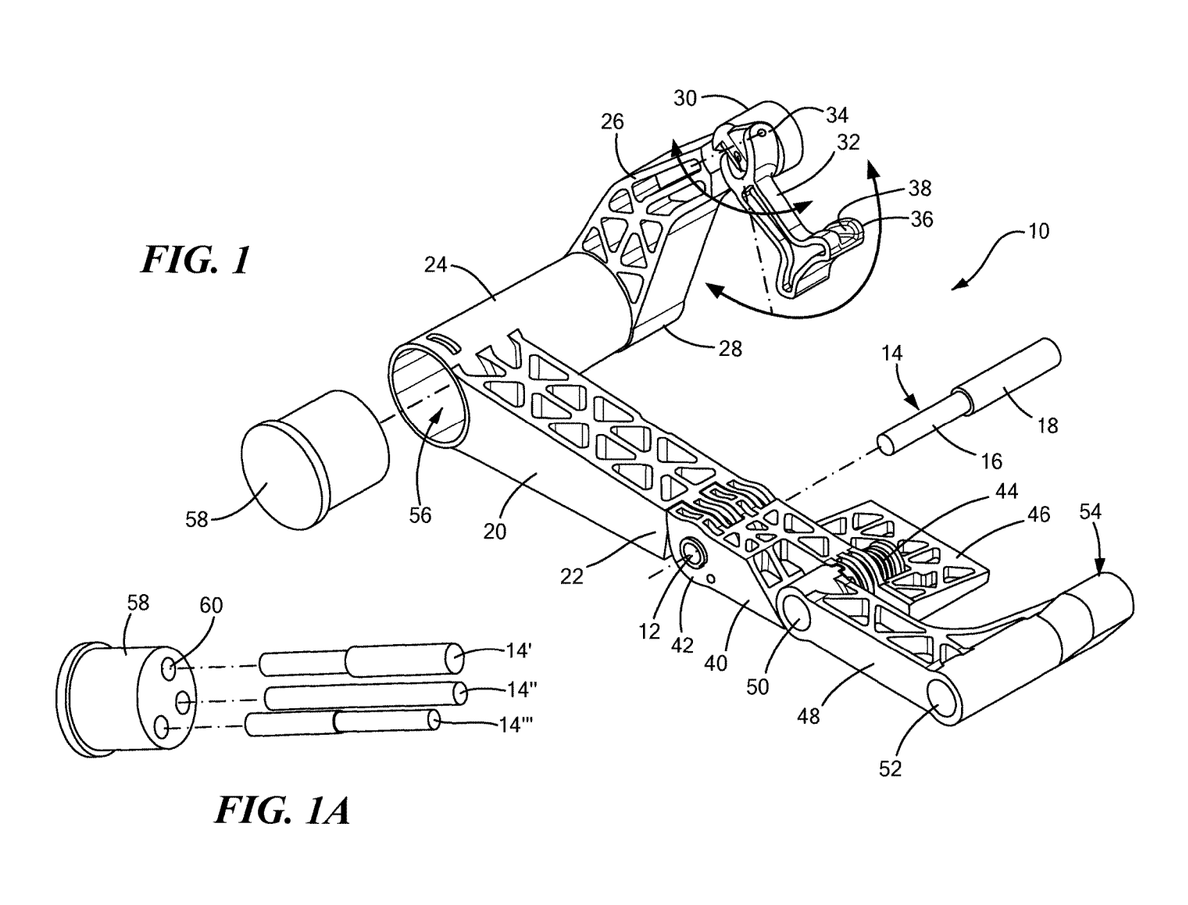
FIG. 1 is a perspective view of a tool in accordance with the invention.
FIG. 1A is a perspective view of portion of the tool illustrated in FIG. 1

Turning now to the figures, FIG. 1 is a perspective view of a tool 10 in accordance with the invention. The tool 10 includes a securing device including a pivot point 12 and a pin 14 associated with the pivot point. The pin is shown having a first portion 16 that is received within the pivot point 12, and a second portion 18 that extends laterally from the pivot point. The tool includes a chain lift including a first portion 20 having a first end 22 and a second end 24, the first end being pivotable about the pivot point 12 and pin 14 of the securing device. The second end 24 extends laterally in the same direction as the pin 14. A second portion 26 has a first end 28 and a second end 30. The first end 28 of the second portion 26 is pivotally secured to the laterally extending element of the second end 24 of the first portion 20. A third portion 32 has a first end 34 and a second end 36, the first end 34 of the third portion 32 being pivotally secured to the second end 30 of the second portion 26 and pivotable longitudinally and laterally with respect to the second portion 26. The third portion distal end 36 can define a channel 38.

Continuing to refer to FIG. 1, a locking mechanism includes a first portion 40 having a first end 42 and a second end 44. The first end 42 is pivotable about the pivot point 12 and pin 14 of the securing device. The second end 44 defines a first support element 46 that projects laterally in the same direction as the pin 14. The locking mechanism further includes a second portion 48 having a first end 50 and a second end 52. The first end 50 of the second portion 48 is pivotally secured to the second end 44 of the first portion 40. A second support element 54 is fixed to the second end 52 of the second portion 48. The second support has a first end and a second end.

Continuing to refer to FIG. 1, the second end 24 of the first portion 20 can define a cavity 56 that can be covered with a cap 58. FIG. 1A shows how the cap can be provided with retaining elements 60, such as clips or cavities that can receive and hold secure a variety of pins 14', 14", and 14'" of different shape and dimension.

Each of the above described pivot points can include locking mechanisms to inhibit rotation or movement of one part with respect to another. As will be described below, the first support element 46 and the second support element 54 can be provided with padding or made of a resilient material as they are intended to contact various portions of a bicycle that it would be advantageous not to scratch or otherwise damage.

Figure 2:
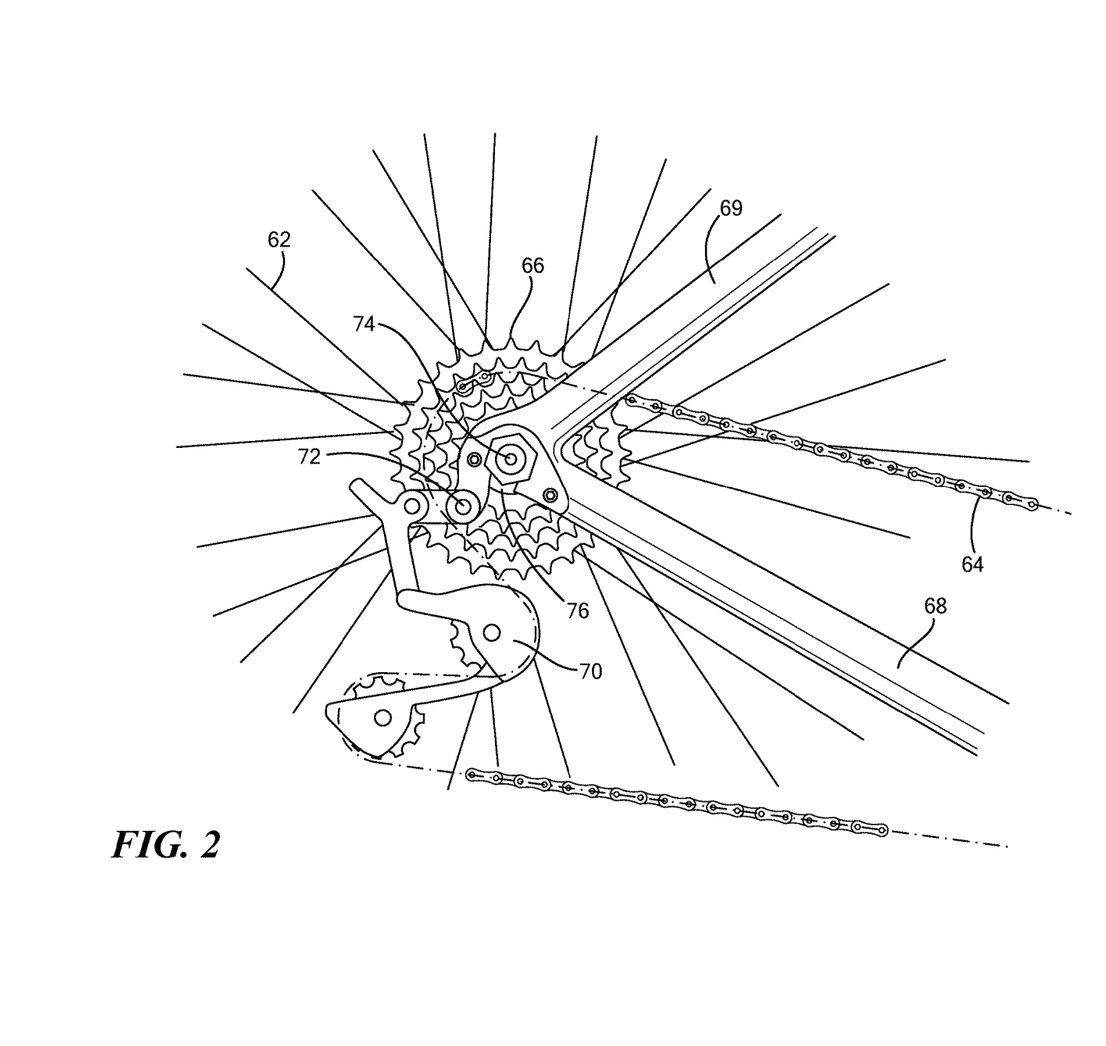
FIG. 2 is a side view of a portion of a rear bicycle wheel.

Turning now to the remaining figures, the tool 10 will be better understood in context, wherein the figures show a series of steps in the use of the tool. FIG. 2 is a side view of a portion of a right rear side of a bicycle having a wheel with spokes 62, chain 64, cassette of cogs/gears 66, chain stay 68, seat stay 69, rear derailleur 70 having derailleur pivot point 72, wheel axle 74, and dropout 76. The dropout 76 is a notch at the end of the left (not shown) and right chain stays 68 and seat stays 69 that allows the axel of the wheel to be lowered from the bike frame for removal and replacement. For most models of derailleur, the derailleur pivot point 72 is the single attachment point of the derailleur to the bicycle frame. The derailleur pivot point 72 has a central hole or notch that the pin 14 can be inserted into.

Figure 3:
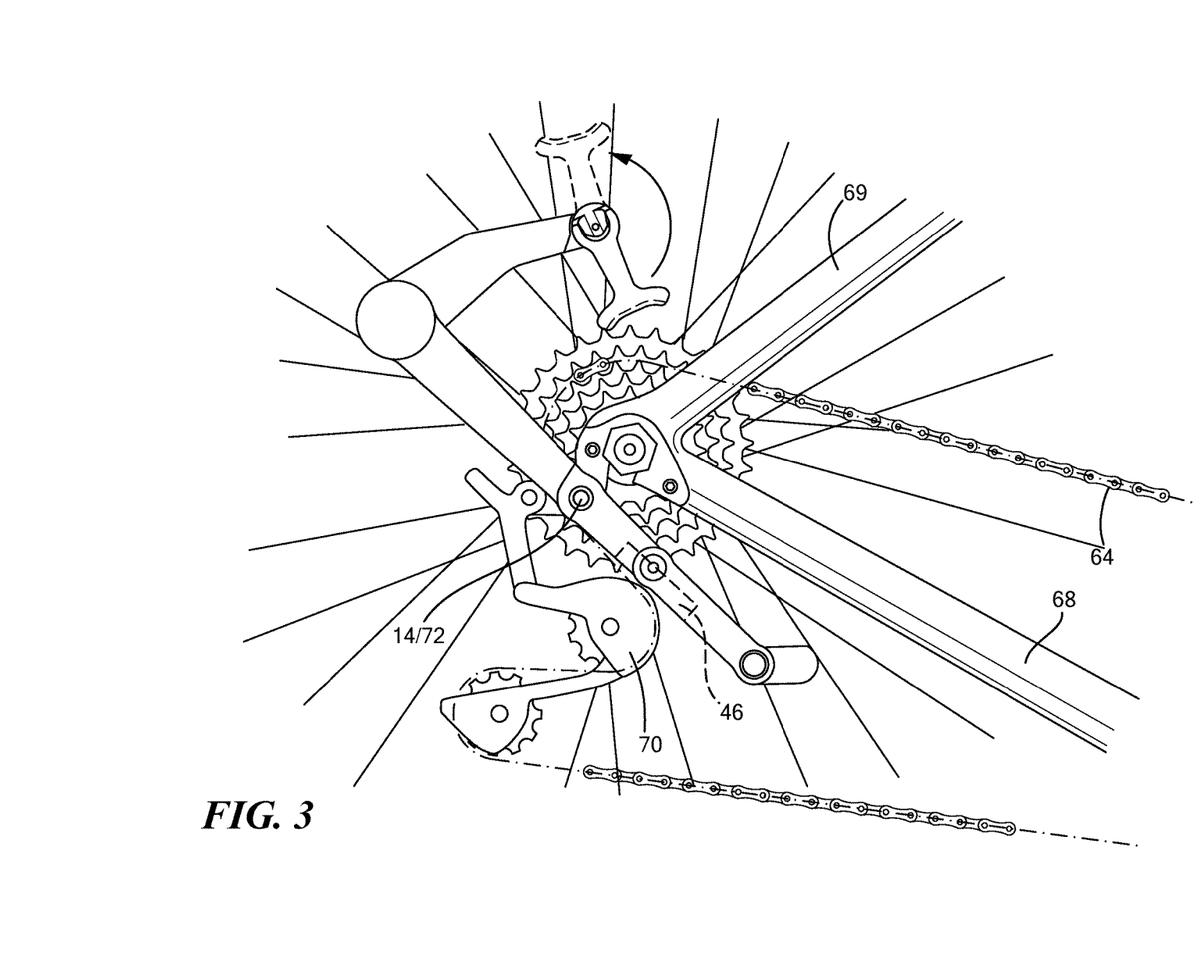
FIG. 3 illustrates the tool of the invention engaged with rear bicycle wheel of FIG. 2.

FIG. 3. Illustrates the tool of the invention engaged with the bike frame by inserting the pin 14 into the derailleur pivot point 72. The pin 14 may contain a cam operated locking feature which locks the pin to the derailleur pivot point. The first support element 46 rests upon a portion of the derailleur 70. Although a pin inserted into the pivot point is a convenient and effective device for securing the tool to the bike frame, it is contemplated that a portion of the tool could be clipped or strapped to the bike frame as well to function as the securing device. For example, the tool can be secured to one or both chain stays, and/or a pin, rod or spindle can be inserted into the axel through hole in a frame designed for disc brakes.

Figure 4:
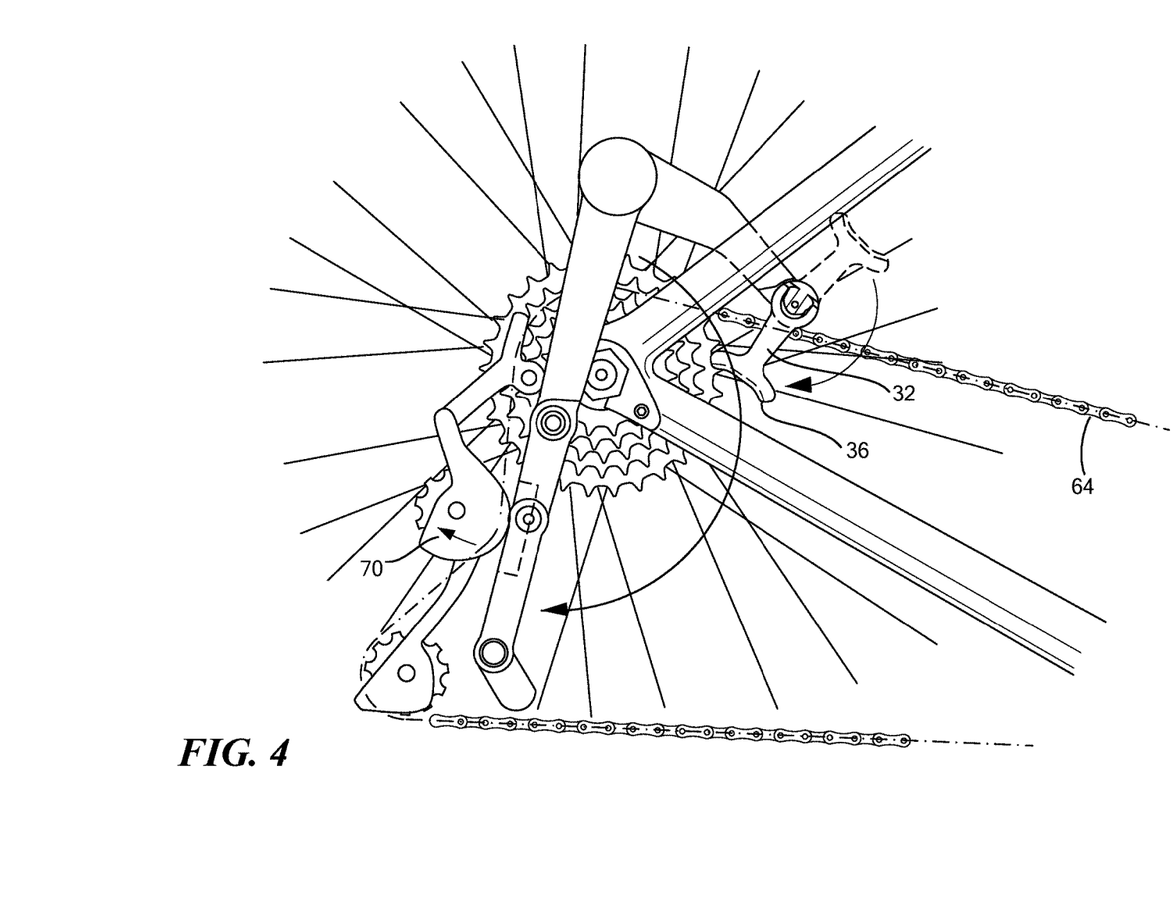
FIG. 4 shows the rear derailleur being pushed rearward by the tool.

FIG. 4 shows the spring-biased, rear derailleur 70 being pushed rearward by the tool with sufficient force to overcome the spring bias. The third portion 32 of the chain lift is rotated laterally and downward so that the second end 36 of the third portion 32 is positioned under the chain 64 to align the channel, which is slightly wider than the chain 64, with the chain, so that in a subsequent step the chain can be received within the channel.

Figure 5:
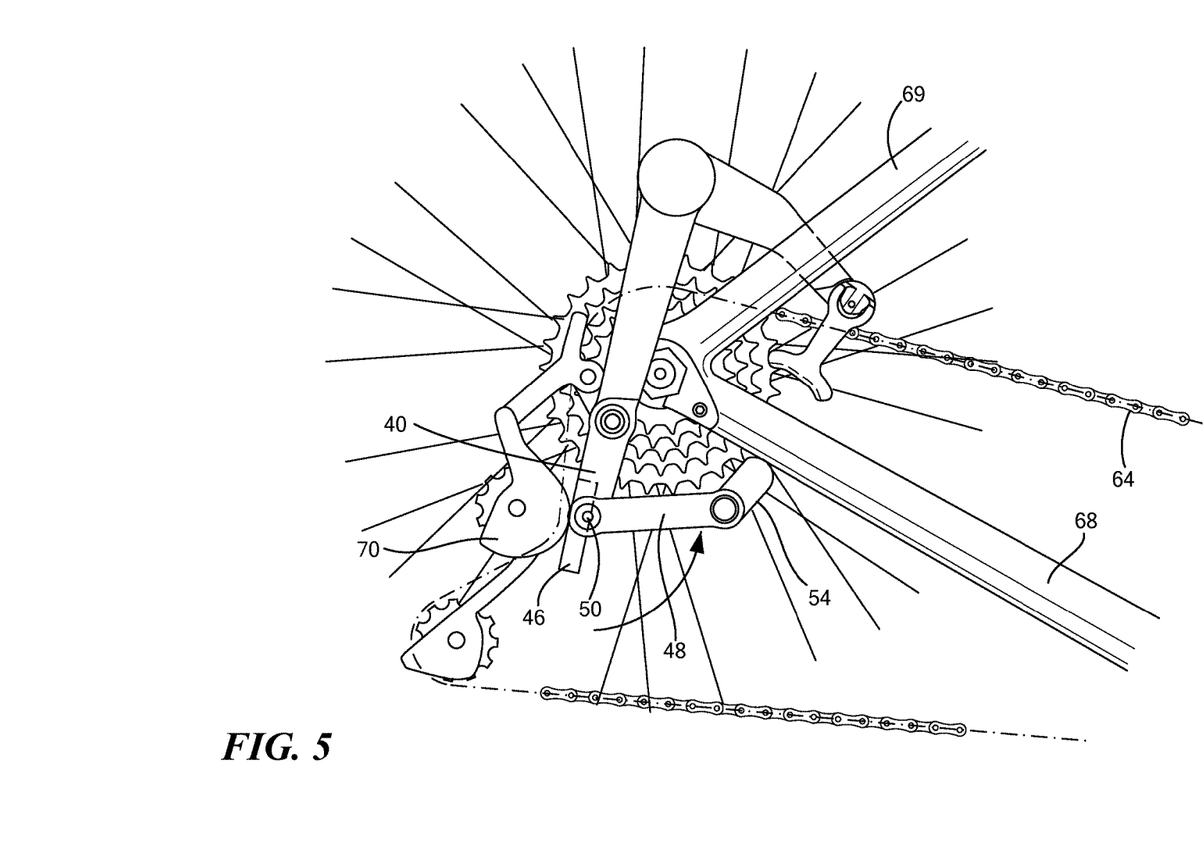
FIG. 5 depicts a portion of the tool engaged with the bicycle frame to hold the derailleur in the rearward position.

FIG. 5 depicts a portion of the tool engaged with the bicycle frame to hold the derailleur 70 in the rearward position. This view is similar to that of FIG. 4. However, in this view, the second portion 48 of the locking mechanism has been pivoted upward with respect to the first portion 40 to place the second support element 54 in contact with the chain stay 68. The second portion 48 is angled with respect to the first portion 40 thereby "locking" the portions in place to hold the derailleur 70 rearward. Alternatively, a locking mechanism can be provided at the first end 50 of the second portion 48 and the second end 44 of the first portion 40. In this view, the first support element 46 is clearly shown in contact with the derailleur 70. It should also be noted that the second end 24 of the first portion 20 of the chain lift extends far enough laterally so that the second portion 26 can pass behind the upper seat stay 69 and be positioned above the chain.

Figure 6:
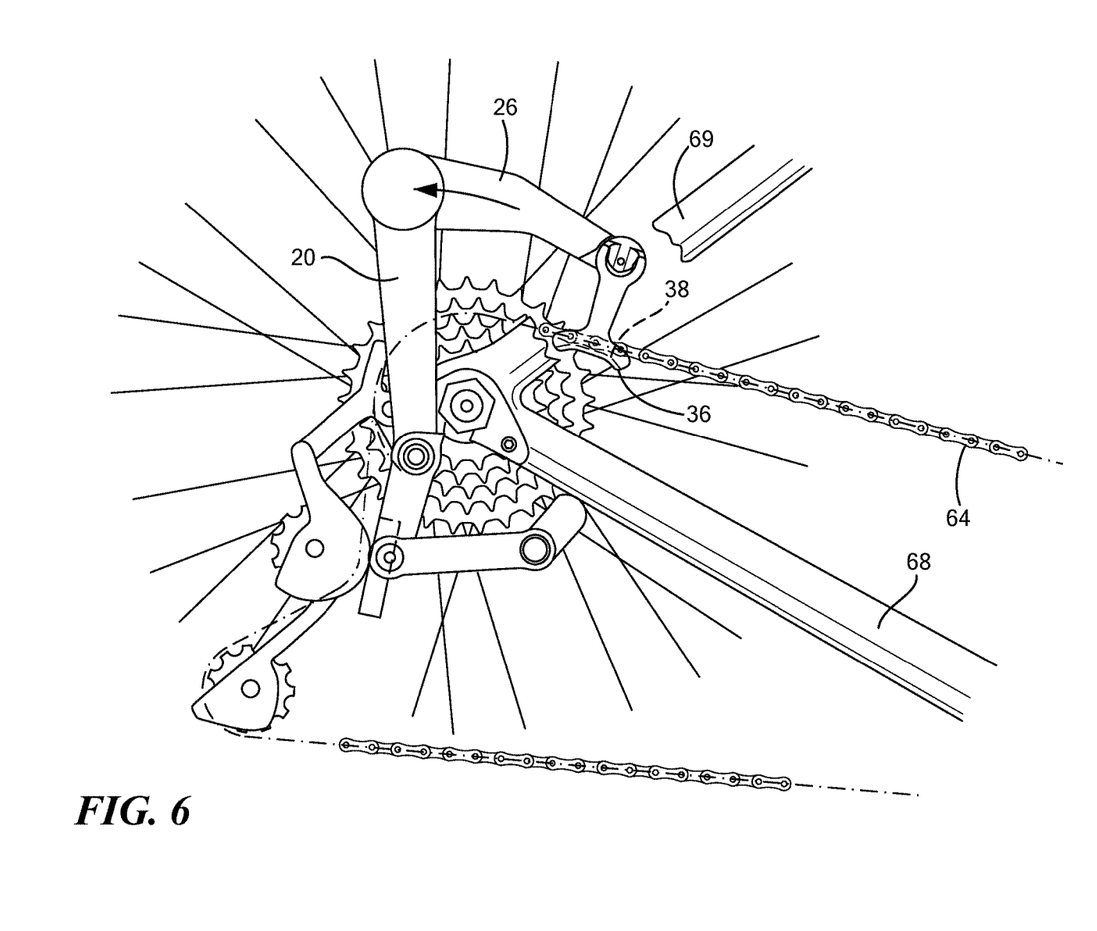
FIG. 6 depicts a portion of the tool engaged with the chain in preparation for disengagement of the chain from the gear cassette.

FIG. 6 shows the first portion 20 being pivoted rearward about the pin 14/derailleur pivot point 72, causing the second portion 26 to rise and thereby cause the chain 64 to enter the channel 38 of the second end 36 of the third portion 32. The laterally projecting second end 24 of the first portion 20 provides a convenient "handle" to pull.

Figure 7:
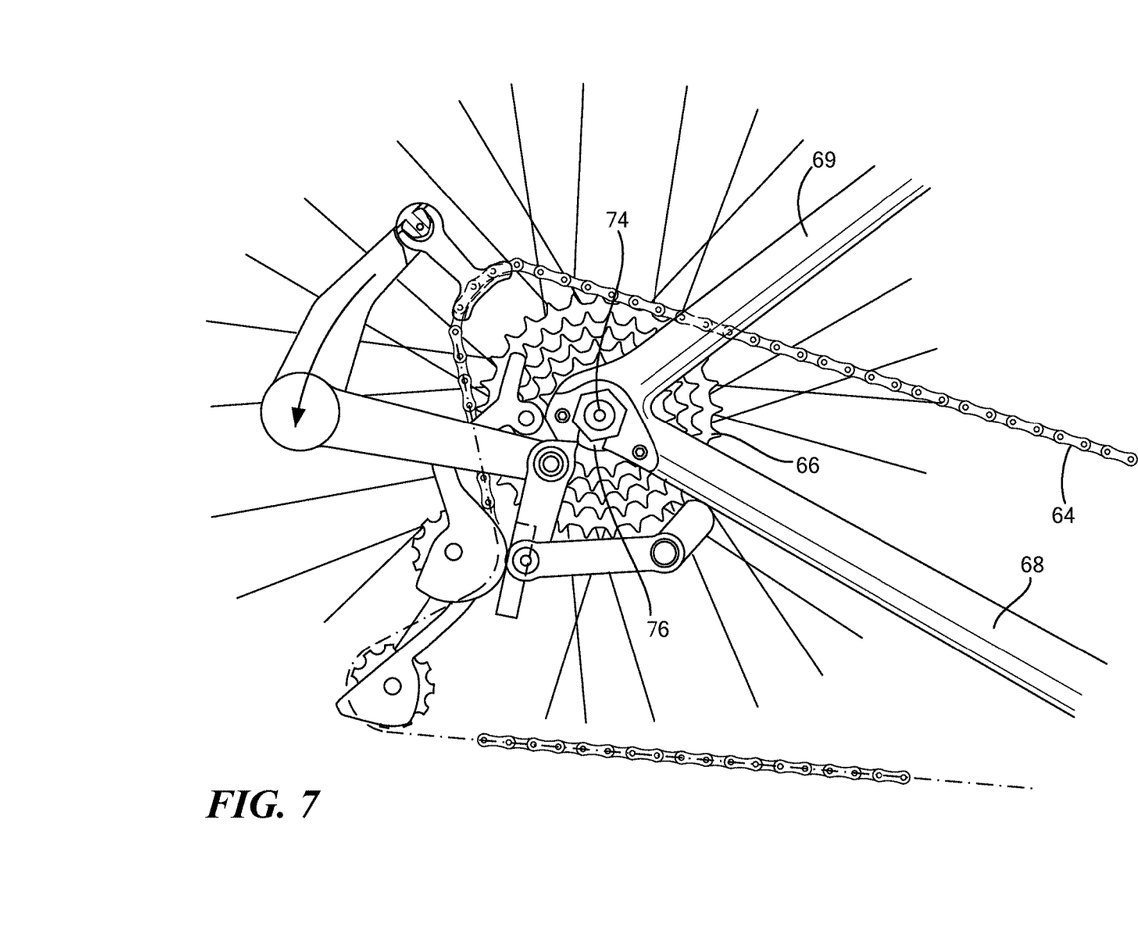
FIG. 7 shows the tool being actuated to pull the chain away from the gear cassette.

FIG. 7 shows the continuation of the pulling movement that causes the chain to be disengaged from the cassette 66. Now the wheel axle 74 can be loosened and allowed to travel downward from the dropout 76 for removal from the bicycle.

Figure 8:
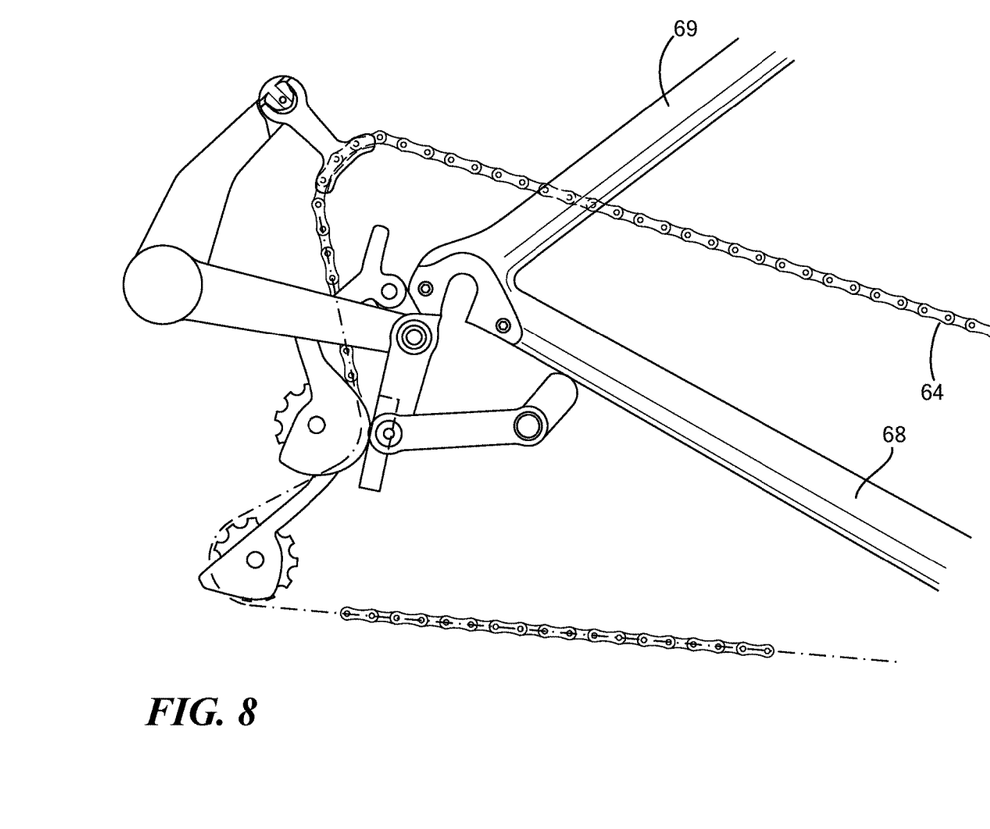
FIG. 8 shows the tool engaged with the bicycle frame with the wheel removed.

FIG. 8 shows the tool engaged with the bicycle frame with the wheel removed.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A tool for use with a bicycle having a rear derailleur secured to a bicycle frame at a derailleur pivot point, the derailleur pivot point defining an aperture, the rear derailleur maintaining a chain in selective engagement with a wheel having an axel mounted cassette with a plurality of cogs, wherein the wheel is securable to the bicycle frame having frame elements that include chain stays, the tool comprising:
   a securing device to maintain the tool in a fixed position with respect to the bicycle; and
   a chain disengagement element moveably attached to the securing device,
   wherein moving the chain disengagement element moves a portion of the chain away from the axel mounted cassette sufficiently to completely disengage the chain from the axel mounted cassette.

2. The tool in accordance with claim 1, further comprising a locking mechanism to prevent the chain disengagement element from moving with respect to the securing device.

3. The tool in accordance with claim 1, further comprising a derailleur hold element that is movable with respect to the securing device to pivot the rear derailleur.

4. The tool in accordance with claim 3, wherein the derailleur hold element is lockable to maintain the rear derailleur in a selected position.

5. The tool in accordance with claim 1, wherein the securing device includes a pin that is insertable into the aperture defined by the derailleur pivot point.

6. The tool in accordance with claim 5, wherein chain disengagement element rotates about the pin.

7. The tool in accordance with claim 5, wherein the pin is removable from the securing device.

8. The tool in accordance with claim 7, wherein the pin is selected from a group of pins of different sizes that are stored with a cavity defined by the tool.

9. The tool of claim 1, wherein the chain disengagement element includes:
   a first portion having a first end and a second end, the first end pivotable with respect to the securing device, the second end having a laterally extending element,
   a second portion having a first end and a second end, the first end of the second portion being pivotally secured to the laterally extending element of the second end of the first portion,
   a third portion having a first end and a second end, the first end of the third portion being pivotally secured to the second end of the second portion.

10. The tool of claim 9, wherein the third portion pivots longitudinally and laterally with respect to the second portion.

11. The tool of claim 1, wherein the chain disengagement element has a distal end portion that defines a channel to receive the chain.

12. The tool of claim 9, wherein the securing device includes:
   a first portion having a first end and a second end, the first end being pivotable with respect to the securing device,
   a second portion having a first end and a second end, the first end of the second portion being pivotally secured to the second end of the first portion,
   a first support element projecting laterally from the first portion,
   a second support element projecting radially from the second portion.

13. The tool of claim 12, wherein the first support element is padded.

14. The tool of claim 12, wherein the second support element is padded.

15. A tool having, comprising:
   a securing device including a pivot point and a pin associated with the pivot point, the pin extending laterally from the pivot point;
   a chain lift including a first portion having a first end and a second end, the first end being pivotable about the pivot point and pin of the securing device, the second end extending laterally in the same direction as the pin, a second portion having a first end and a second end, the first end of the second portion being pivotally secured to the laterally extending element of the second end of the first portion, and a third portion having a first end and a second end, the first end of the third portion being pivotally secured to the second end of the second portion, the third portion pivotable longitudinally and laterally with respect to the second portion, and the third portion having a distal end portion that defines a channel; and
   a locking mechanism including a first portion having a first end and a second end, the first end being pivotable about the pivot point and pin of the securing device, a second portion having a first end and a second end, a first support element projecting laterally from the first portion, the first end of the second portion being pivotally secured to the second end of the first portion, and a second support element projecting laterally in the same direction as the first support element and for a greater distance.

* * * * *